(12) United States Patent
Bacher et al.

(10) Patent No.: US 7,975,830 B2
(45) Date of Patent: Jul. 12, 2011

(54) METHOD AND DEVICE FOR MEASURING THE PROPERTIES OF MOVING OBJECTS

(75) Inventors: Martin Bacher, Terenten (IT); Federico Giudiceandrea, Bressanone (IT)

(73) Assignee: Microtec S.R.L., Bressanone (IT)

( * ) Notice: Subject to any disclaimer, the term of this patent is extended or adjusted under 35 U.S.C. 154(b) by 133 days.

(21) Appl. No.: 12/090,617

(22) PCT Filed: May 28, 2007

(86) PCT No.: PCT/IT2007/000370
§ 371 (c)(1),
(2), (4) Date: Apr. 17, 2008

(87) PCT Pub. No.: WO2008/038319
PCT Pub. Date: Apr. 3, 2008

(65) Prior Publication Data
US 2009/0273795 A1 Nov. 5, 2009

(30) Foreign Application Priority Data

Sep. 26, 2006 (IT) ................ VR2006A0144

(51) Int. Cl.
*B65G 47/31* (2006.01)
(52) U.S. Cl. .......... 198/461.2; 198/502.2; 198/579; 198/792
(58) Field of Classification Search .......... 198/461.1, 198/461.2, 461.3, 462.1, 462.3, 579, 459.1, 198/459.8, 460.1, 792, 339.1, 341.08, 341.09, 198/418.7, 419.2, 502.2
See application file for complete search history.

(56) References Cited

U.S. PATENT DOCUMENTS

| 2,184,905 | A | * | 12/1939 | Brintnall | 198/462.3 |
| 2,752,883 | A | * | 7/1956 | Curtis | 118/316 |
| 3,072,095 | A | * | 1/1963 | Morgan, Jr. et al. | 118/685 |
| 3,486,602 | A | | 12/1969 | Zuercher | |
| 3,736,968 | A | * | 6/1973 | Mason | 144/357 |
| 3,890,509 | A | | 6/1975 | Maxey | |
| 3,901,375 | A | * | 8/1975 | Raque | 198/461.3 |
| 4,040,512 | A | * | 8/1977 | Ness | 198/460.1 |

(Continued)

FOREIGN PATENT DOCUMENTS
EP 0798240 A 10/1997
(Continued)

*Primary Examiner* — Gene Crawford
*Assistant Examiner* — William R Harp
(74) *Attorney, Agent, or Firm* — Pearne & Gordon LLP

(57) ABSTRACT

A device for measuring the properties of moving objects includes a station (5) for measuring predetermined properties of an object (100) and a first conveyor (2) for transferring the object (100) towards the measuring station (5). The device (1) includes accelerator means (6) for accelerating the object (100), acting on the object and positioned upstream of the measuring station (5) and slowing means (7) for slowing or stopping the object (100), acting on the object and positioned at the measuring station (5). A method for measuring the properties of moving objects includes the steps of: transporting an object (100) along a first conveyor (2) having a predetermined feed speed (T1); accelerating the object (100) relative to the first conveyor (2) feed speed (T1) then slowing the object (100) relative to the first conveyor (2) feed speed (T1) at least at a station (5) for measuring predetermined properties of the object (100).

33 Claims, 4 Drawing Sheets

U.S. PATENT DOCUMENTS

| | | | | |
|---|---|---|---|---|
| 4,044,891 A | * | 8/1977 | Pynsky | 209/597 |
| 4,301,373 A | * | 11/1981 | Sjodin | 250/559.06 |
| 4,456,117 A | * | 6/1984 | Szczepanski | 198/459.8 |
| 4,771,877 A | * | 9/1988 | Langen | 198/461.3 |
| 4,838,408 A | * | 6/1989 | Brawn | 198/434 |
| 5,142,955 A | * | 9/1992 | Hale | 83/75.5 |
| 5,547,004 A | | 8/1996 | Fransen | |

FOREIGN PATENT DOCUMENTS

WO    W09315005 A    8/1993

* cited by examiner

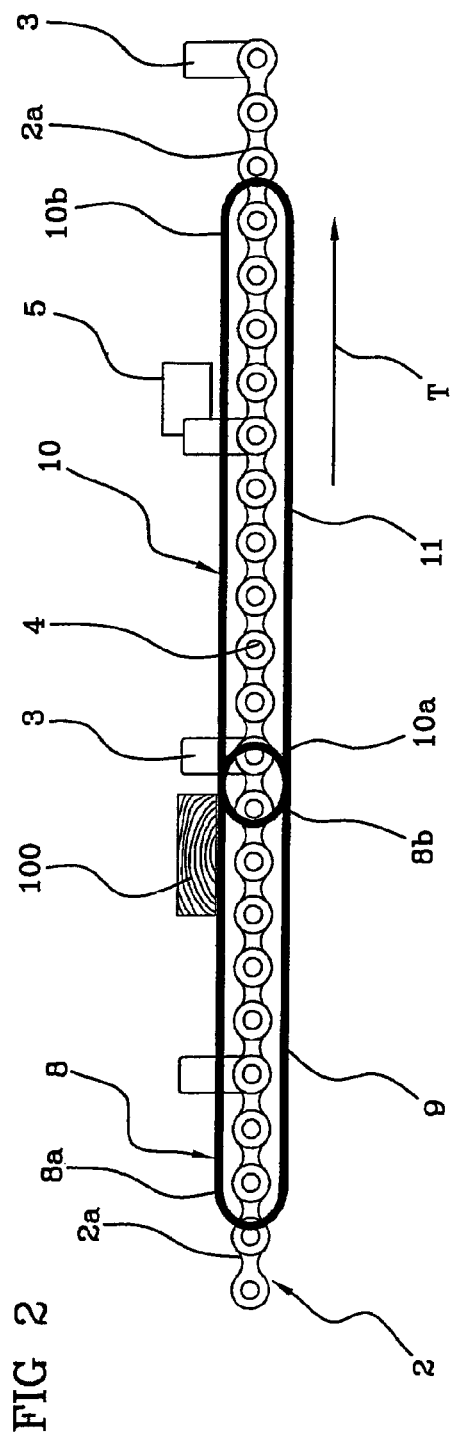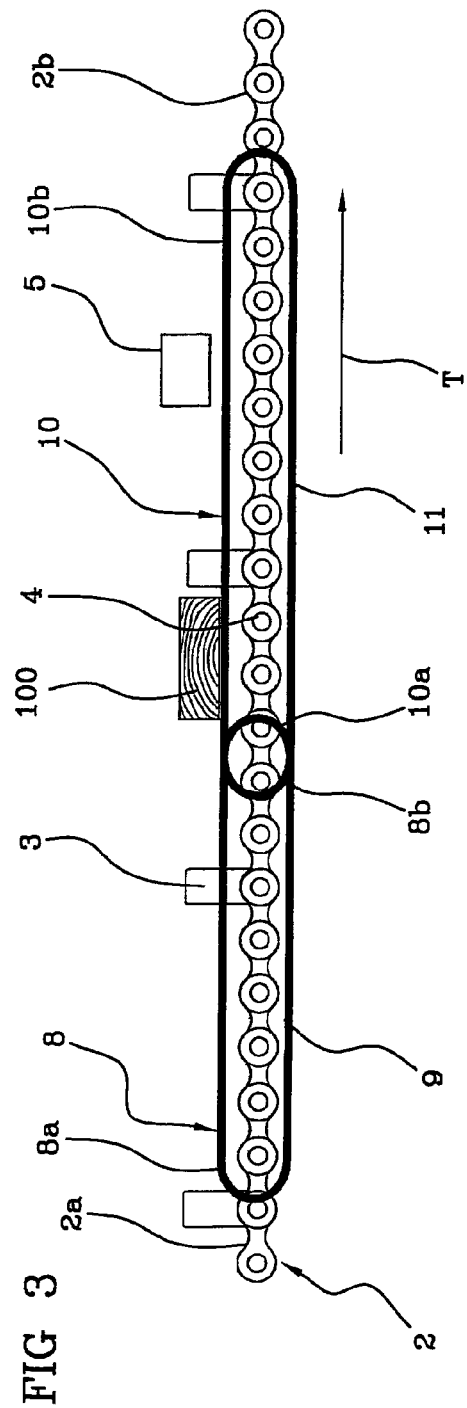

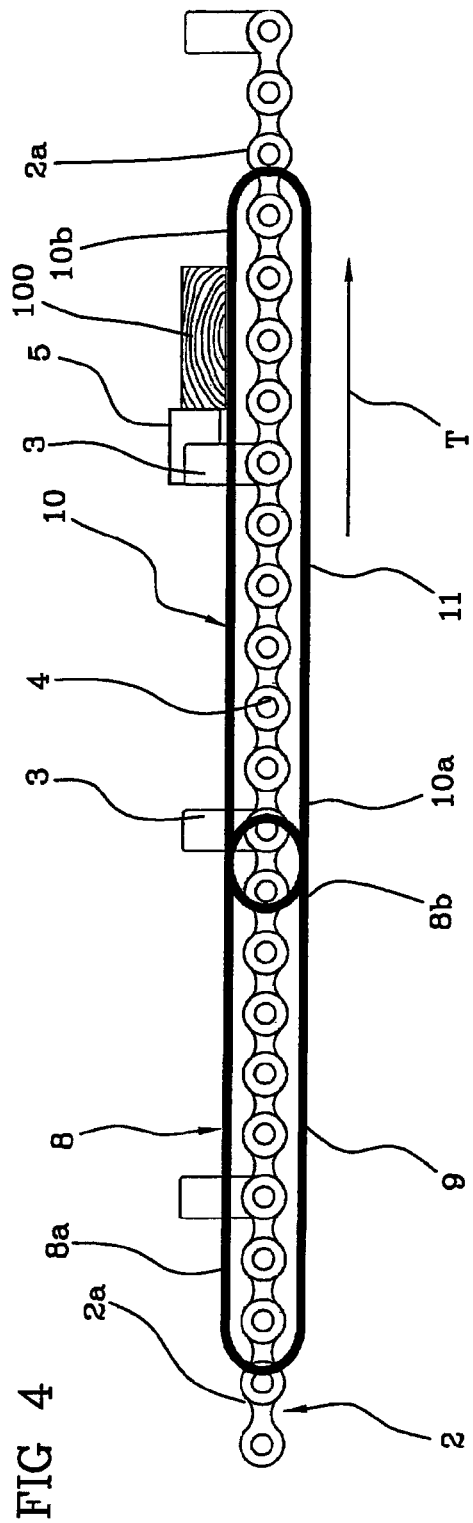
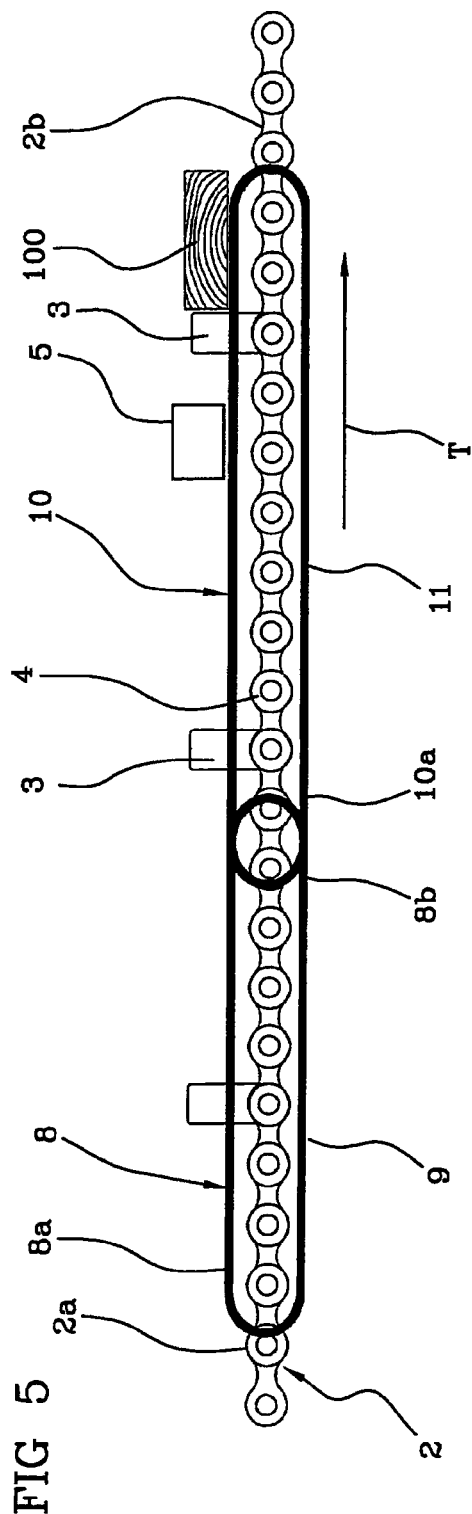

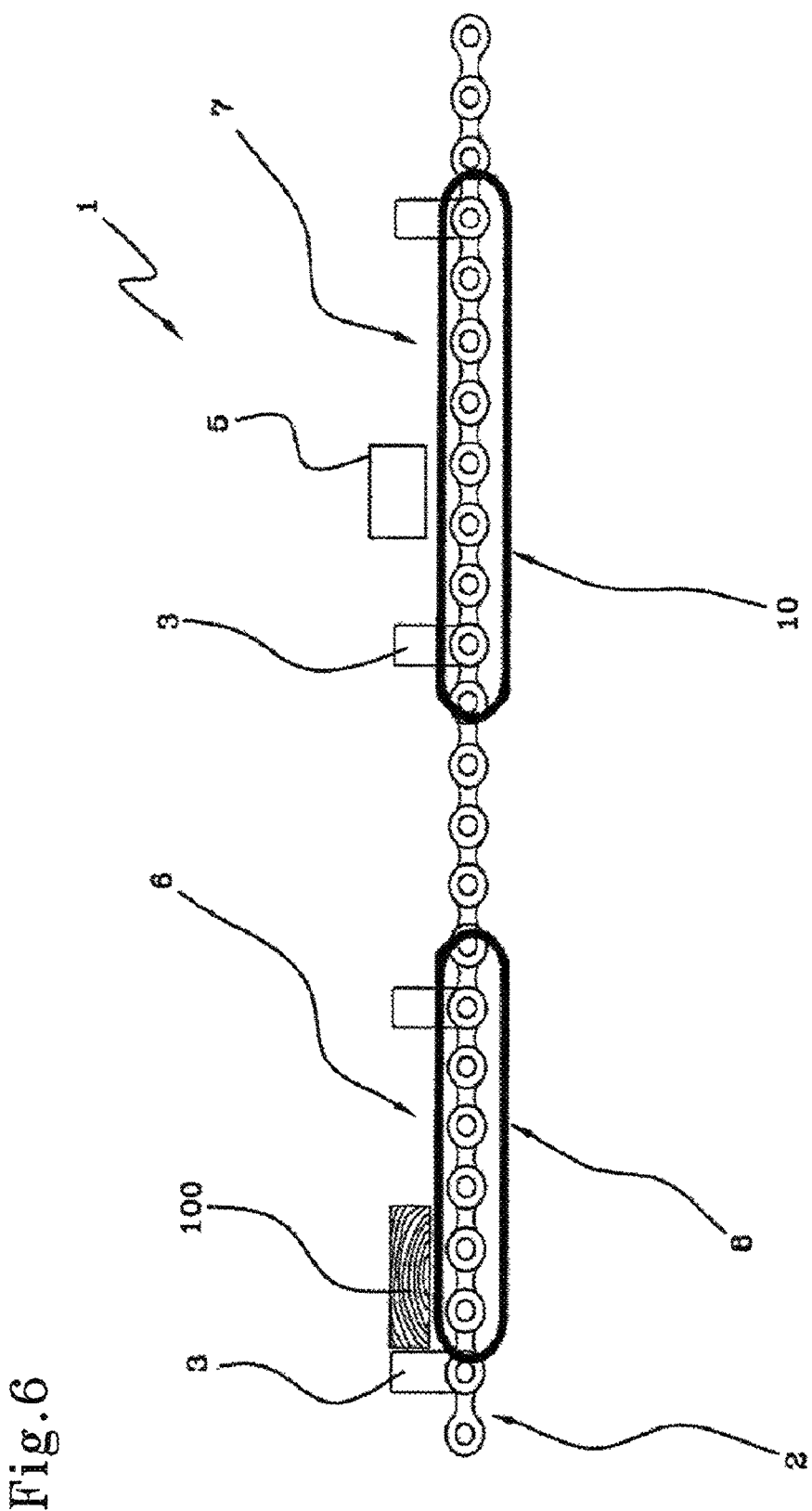

METHOD AND DEVICE FOR MEASURING THE PROPERTIES OF MOVING OBJECTS

TECHNICAL FIELD

The present invention relates to a method and a device for measuring the properties of moving objects.

In particular, the present invention relates to a method and a device for measuring the properties of moving objects which can be applied particularly in the woodworking sector, but which can also be used in any other sector.

BACKGROUND ART

Very often some properties of unmachined, semi-finished or machined objects have to be measured before they are subjected to further machining.

With reference to the woodworking sector, very often measurements must be taken, such as defining dimensions, a surface scan, defining the moisture content, of objects such as unmachined trunks, semi-finished boards, panels, before they are subjected to further cutting operations, in order to identify the type and optimum direction of cutting to which they must be subjected.

According to the prior art such measurements are taken as the objects are transported towards the machining station, to optimise machining system productivity.

In particular, objects are transported using conveyor belts, there being a measuring station along the direction of transport. However, to guarantee precise measurement of the properties to be identified, the objects must pass in front of the measuring station at a speed that is much lower than the transport speed.

For this purpose methods and devices have been produced for measuring the properties of moving objects which involve slowing, or even stopping, the objects transported close to the measuring station.

However, such prior art methods and devices entail an inevitable increase in the times the objects take to travel along the conveyors.

This increase in travelling times translates into a reduction in productivity, that is to say, a fall in the number of objects which can be machined in the unit of time.

DISCLOSURE OF THE INVENTION

In this context, the main technical purpose of the present invention is to propose a method and a device for measuring the properties of moving objects which is free of the above-mentioned disadvantages.

In particular, the present invention has for an aim to provide a method and a device for measuring the properties of moving objects which does not alter the times required for the objects to travel along the conveyors.

The present invention also has for an aim to propose a method and a device for measuring the properties of moving objects which maximises production capacity.

The technical purpose indicated and the aims specified are substantially achieved by a method and a device for measuring the properties of moving objects comprising the technical features described in one or more of the claims herein.

BRIEF DESCRIPTION OF THE DRAWINGS

Further features and advantages of the present invention are more apparent in the description below, with reference to a preferred, non-limiting, embodiment of a method and a device for measuring the properties of moving objects, illustrated in the accompanying drawings, in which:

FIG. 2 is a view of the device of FIG. 1 in a second operating condition;

FIG. 3 is a view of the device of FIG. 1 in a third operating condition;

FIG. 4 is a view of the device of FIG. 1 in a fourth operating condition;

FIG. 5 is a view of the device of FIG. 1 in a fifth operating condition; and

FIG. 6 is a view of the device of the invention in another operating condition.

DETAILED DESCRIPTION OF THE PREFERRED EMBODIMENTS OF THE INVENTION

Figure 1:
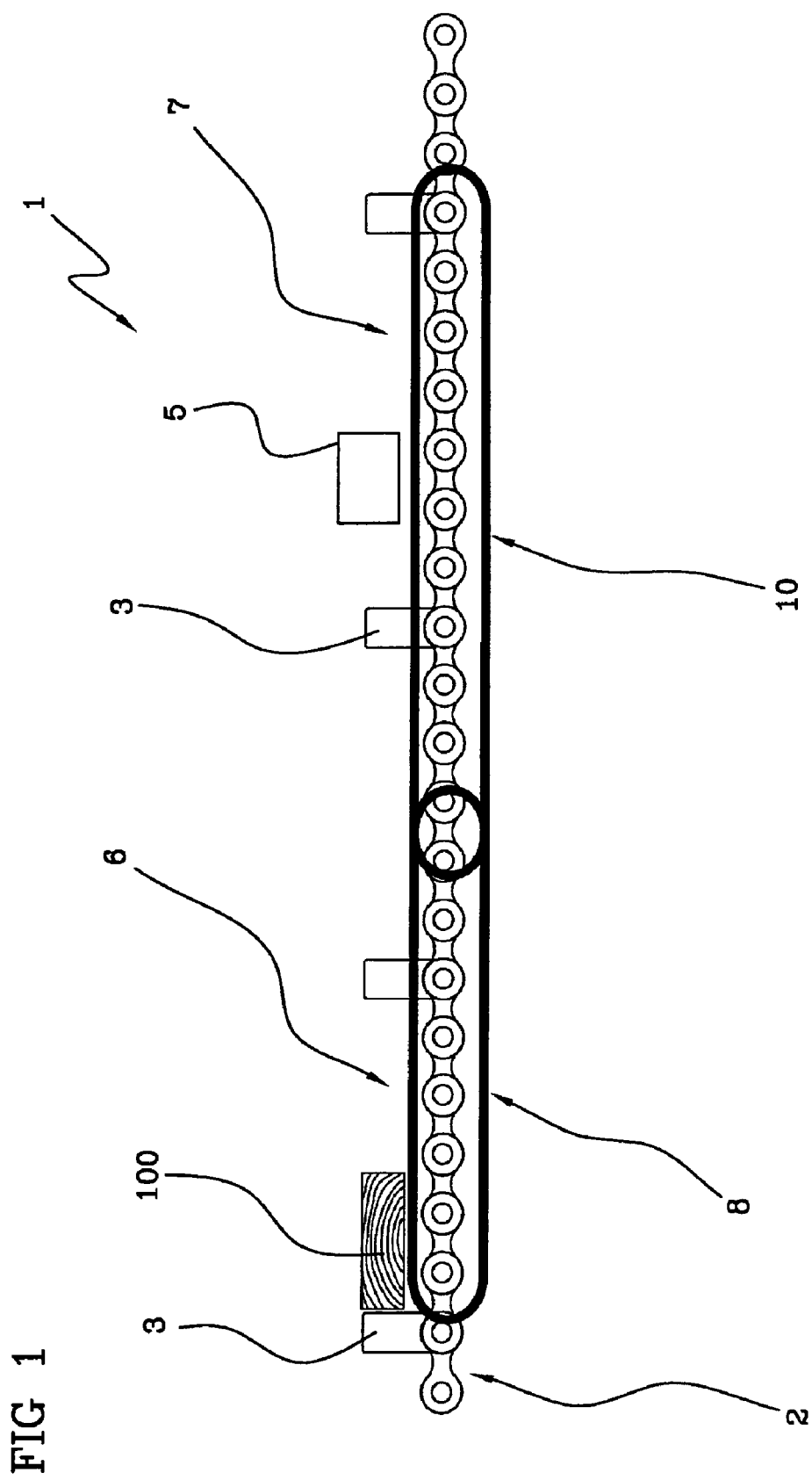
FIG. 1 is a schematic view of a device for measuring the properties of moving objects in accordance with the present invention, in a first operating condition.

With reference to the accompanying drawings, the numeral 1 denotes as a whole a device for measuring the properties of moving objects.

The device 1 comprises a first conveyor 2 which feeds an object 100 at a predetermined speed T1.

It must be emphasised that in the preferred embodiment the object 100 is represented as a wooden semi-finished product, since the preferred form of the invention is intended for application in the woodworking sector.

However, the object according to the invention may be intended for any other technical sector.

The first conveyor 2 comprises a plurality of pusher elements 3 acting on the object 100 to be transported by pushing it.

In the preferred embodiment illustrated in the accompanying drawings, the first conveyor 2 comprises one or more chains 4 parallel with one another, extending along a longitudinal direction of transport T and wound around pulleys (not illustrated), at least one of which is connect to a power source (not illustrated).

The pusher elements 3 are integral on the chains 4. The pusher elements push the objects 100 along the first conveyor 2.

The pusher elements 3 present on the various chains 4 (only one of which is visible in the accompanying drawings), are transversally aligned to push the object 100 to be transported along its entire transversal extension.

It should be noticed that the accompanying drawings show only one pusher element 3 for each transversal alignment of pusher elements, since the other pushers 3 are hidden, as one looks at the drawings, by the pusher element in view.

The pusher elements 3 are longitudinally equidistant, that is to say along the direction of transport T, separated by a distance greater than the transversal dimension of the objects 100. On one hand this is because the conveyor 2 must be able to transport objects 100 having different dimensions, and on the other hand it facilitates the loading and unloading of objects 100 on and from the conveyor 2.

The device 1 also comprises a measuring station 5, schematically illustrated, for detecting certain features or properties of the objects 100.

The measuring station 5 may be a gauge for measuring object dimensions, or a scanner for the surface of the object 100, or a detector of the moisture present in the object 100, or another unit.

Irrespective of the specific type or types of measuring units present in the measuring station 5, it is important to emphasise that such sensors need a time for inspection of the object which is greater than the time for which the object 100 remains in front of the sensor when the object is transported at the first conveyor 2 feed speed T1.

In order to take the measurement correctly, the device 1 comprises accelerator means 6, for accelerating the object 100, acting on the object itself and positioned upstream of the measuring station 5, and slowing means 7, for slowing or stopping the object 100, acting on the object itself and positioned at the measuring station 5.

In this way, as explained below, the object 100 remains in front of the measuring station 5 for the time needed for the measurement without increasing the time it takes to travel between the conveyor 2 infeed and outfeed.

In particular, the accelerator means 6 comprise a second conveyor 8 having a first end 8a giving directly onto the first conveyor 2 (at a first end 2a in the accompanying drawings) to take the objects 100 to be measured from it, and a second end 8b, opposite the first 8a, for releasing the objects 100. In the accompanying drawings the second end 8b of the second conveyor 8 gives onto the slowing means 7. However, in other embodiments it may give onto the first conveyor 2, as shown in FIG. 6.

The second conveyor 8 comprises one or more conveyor belts 9 (of which only one is visible in the accompanying drawings), or devices similar from a functional viewpoint, extending along the direction of transport T and which may, for example, be inserted between the chains 4 of the first conveyor 2, so that the pushers 3 can be pulled by the chains 4 without interfering with the conveyor belts 9.

In other words, in the case of chains 4 and conveyor belts 9 inserted between them, the transversal dimensions of the pushers 3 are less than the distance between two parallel conveyor belts 9.

In this way, the objects 100 transported by the first conveyor 2, and in particular pushed by the pushers 3 which are transversally aligned with one another, are pushed onto the second conveyor 8 (which in the embodiments illustrated lifts them relative to the first conveyor 2).

The second conveyor 8 transports the objects 100 at a speed T2 which is greater than the transport speed T1 of the first conveyor 2, moving the objects 100 away from the respective pushers 3.

The latter continue in their trajectory parallel with the direction of transport T, for example running between one conveyor belt 9 and the other (emerging from them in the accompanying drawings), pulled by the respective chains 4.

In the accompanying drawings the slowing means 7 comprise a third conveyor 10 having a first end 10a giving directly onto the second end 8b of the second conveyor 8 to receive from the latter objects 100 to be transferred in front of the measuring station 5, and a second end 10b, opposite the first end 10a, giving onto a second end 2b of the first conveyor to release onto the latter the objects 100 which have already passed in front of the measuring station 5. However, in other embodiments, if the third conveyor 10 is at a distance from the second conveyor 8, the first end 10a of the third conveyor 10a may give directly onto the first conveyor 2.

The third conveyor 10 may also comprise one or more conveyor belts 11 (of which only one is visible in the accompanying drawings), or devices similar from a functional viewpoint, extending along the direction of transport T and which may be inserted between two or more chains 4 of the first conveyor 2, so that the pushers 3 can be pulled by the chains 4 without interfering with the conveyor belts 11.

In other words, the transversal dimensions of the pushers 3 are less than the distance between two parallel conveyor belts 11.

In this way, the objects accelerated by the second conveyor 8 are picked up by the third conveyor 10 which transports them at a speed T3 that is lower than the first conveyor 2 feed speed T1.

The speed T3 of the third conveyor 10 is such that it presents the objects 100 at the measuring station 5 for the time needed to take a precise measurement.

Once the measurement has been taken, the third conveyor 10 releases the object 100 to the first conveyor 2, and in particular to a pusher 3 which transports the object 100 at the speed T1.

It must be emphasised that the pusher which picks up the object 100 at the third conveyor 10 outfeed is the same pusher that released the object to the second conveyor 8, guaranteeing that the object 100 travelling time is determined by the first conveyor 2 speed T1.

For this purpose, the object 100 transit time on the second and third conveyors 8, 10 is substantially equal to the transit time of the pusher elements 3 along the length of the second and third conveyors 8, 10.

In the preferred embodiment illustrated in the accompanying drawings, the first, second and third conveyors 2, 8 and 10 are aligned with one another along a substantially straight path, but they could form any feed path.

Moreover, in the preferred embodiment, the feed speeds of all of the conveyors are constant, for maximum simplification of all moving parts (not illustrated).

A method for measuring the properties of moving objects in accordance with the present invention may be implemented using any device able to implement its steps, including the device 1 described above.

Therefore, for the sake of convenience, the method disclosed will be described with specific reference to the device 1, without in any way limiting the scope for its implementation to the device 1 described.

The method involves feeding the object 100 on the first conveyor 2, for example by placing the object 100 in contact with a first group of pushers 3, transversally aligned as described above.

The pushers 3 push the object 100 at the first conveyor 2 feed speed T1 along the feed direction T.

Close to the first end 8a of the second conveyor 8, the object 100 is pushed by the pushers 3 onto the second conveyor 8, as is schematically illustrated in FIG. 1.

The second conveyor 8, with feed speed T2 which is greater than the first conveyor 2 feed speed T1, accelerates the object 100 distancing it from the first group of pushers 3, which continue their stroke at the speed T1 without interfering with the second conveyor 8.

In particular, the pushers 3 can pass between one conveyor belt 9 and another belonging to the second conveyor 8.

During transport on the second conveyor 8, the object 100 moves further and further away from the first group of pushers 3, until it almost reaches the group of pushers immediately before it, as illustrated in FIG. 2.

At this point, the second end 8b of the second conveyor 8 transfers the object 100 onto the third conveyor 10 (see FIG. 3) which transports the object 100 at a speed T3 which is lower than the first conveyor 2 transport speed T1.

The third conveyor 10 slows the object 100 feed speed along the direction of transport T, making the object 100 pass in front of the measuring station 5 at the speed needed for a correct measurement.

It should be noticed that the pushers 3 may pass between one conveyor belt 11 and another belonging to the third conveyor 10.

During transport on the third conveyor 10, the pushers 3 have a feed speed T1 which is greater than object 100 feed speed T3, therefore, the pushers 3 move towards the object 100 making up the delay built up as the object was transported along the second conveyor 8, as illustrated in FIG. 4.

Once the object 100 has passed in front of the measuring station 5, the object 100 is transported by the third conveyor 10 towards its second end 10b, opposite the end 10a which picked up the object from the second conveyor 8.

At this point, as shown in FIG. 5, the pusher elements 3 have made up the delay built up as the object was transported on the second conveyor 8 and again engage the object 100 and transport it at the first conveyor 2 speed T1.

It must be emphasised that the pusher element which picks up the object 100 at the third conveyor 10 outfeed is the same pusher that released the object to the second conveyor 8, guaranteeing that the object 100 travelling time on the second and third conveyors 8, 10 is determined precisely by the time the first conveyor 2 takes to transfer the pusher elements 3 over the same distance.

The invention described above therefore achieves the preset aims.

Thanks to the fact that the object to be measured is first accelerated and then slowed, the time it takes the object to travel between the first end of the first conveyor and the second end of the first conveyor is precisely that given by the distance between said two points divided by the first conveyor speed T1, without altering the travelling time at all.

Moreover, since the above-mentioned travelling time is precisely that which would be required by an object not subject to any measurement, the production capacity of a system comprising the device disclosed is maximised.

The invention claimed is:

1. A method for measuring a property of a moving object such as a wooden semi-finished product, the method comprising the steps of:
    transporting an object (100) on a first conveyor (2) having a first transport speed (T1) which is constant;
    transferring the object (100) from the first conveyor (2) to a second conveyor (8) having a second transport speed (T2) which is constant and which is greater than the first transport speed (T1) so that the object (100) is accelerated relative to the first transport speed;
    transferring the object (100) to a third conveyor (10) having a third transport speed (T3) which is constant and which is less than the first transport speed (T1);
    transporting the object (100) on the third conveyor (10) at the constant third transport speed (T3) past a station (5) where a predetermined property of the object (100) is measured, so that the measuring is conducted while the object is moving at the constant third transport speed (T3);
    thereafter transferring the object (100) to the first conveyor (2).

2. The method according to claim 1, wherein the step of transporting the object (100) on the first conveyor (2) comprises the steps of providing a plurality of pusher elements (3) with the same first transport speed (T1) and integral with the first conveyor (2) and pushing the object (100) with a first pusher element or group of pusher elements (3).

3. The method according to claim 2, wherein the first conveyor (2) has a first direction of feed, and wherein the pusher elements (3) are equidistant, the distance separating adjacent pusher elements in the first direction of feed being greater than the dimensions of the object (100) along the first direction of feed.

4. The method according to claim 2 wherein, when the object (100) is transported on the second conveyor (8), the object (100) is moved away from the first pusher element (3) and the pusher elements (3) are fed at the first conveyor (2) transport speed (T1) without interfering with the second conveyor (8).

5. The method according to claim 2 wherein, during the step of transporting the object (100) on the third conveyor (10), the pusher elements (3) are fed at the first conveyor (2) transport speed (T1) without interfering with the third conveyor (10).

6. The method according to claim 5 wherein the step of transferring the object (100) to the first conveyor (2) comprises transferring the object (100) from the third conveyor (10) to the first conveyor (2), and wherein, during or after the step of transferring the object (100) from the third conveyor (10) to the first conveyor (2), the first pusher element (3) reaches the object (100) to push it.

7. The method according to claim 6 wherein the object (100) transit time on the second and third conveyors (8, 10) is substantially equal to the transit time of the pusher elements (3) along the length of the second and third conveyors (8, 10).

8. The method according to claim 1, wherein the step of transferring the object (100) to the third conveyor (10) comprises transferring the object (100) from the second conveyor (8) to the third conveyor (10).

9. The method according to claim 1 wherein the step of transferring the object (100) to the first conveyor (2) comprises transferring the object (100) from the third conveyor (10) to the first conveyor (2).

10. The method according to claim 1, wherein a succession of objects (100) pass in front of the measuring station (5); the objects (100) in said succession of objects being spaced out.

11. The method according to claim 1, further comprising, after the accelerating step, a step of transferring the object (100) from the second conveyor (8) to the first conveyor (2), and a step of transferring the object (100) from the first conveyor (2) to the third conveyor (10).

12. The method of claim 1, wherein said object is a wooden semi-finished product.

13. A device for measuring a property of a moving object, the device comprising:
    a station (5) for measuring a predetermined property of the object (100);
    a first conveyor (2) for transporting the object (100) towards the measuring station (5), the first conveyor (2) having a constant first transport speed (T1);
    accelerator means (6) for accelerating the object (100), acting on the object and positioned upstream of the measuring station (5), the accelerator means (6) comprising a second conveyor (8) operatively associated with the first conveyor (2); the second conveyor (8) transporting the object (100) at a constant second transport speed (T2) greater than the first transport speed (T1);
    and slowing means (7) for slowing the object (100), acting on the object and positioned at the measuring station (5), the slowing means (7) comprising a third conveyor (10) transporting the object (100) at the measuring station (5) at a constant third transport speed (T3) which is lower than the first transport speed (T1).

14. The device according to claim 13, wherein the first conveyor (2) comprises a plurality of equidistant pusher elements (3), separated by a distance greater than the dimensions of the object (100) along a direction of transport (T); the object (100) being pushed along the first conveyor (2) by at least one of the pusher elements (3).

15. The device according to claim 14, wherein the pusher elements (3) are integral with the first conveyor (2) and are fed at the first transport speed (T1) without interfering with the second and third conveyors (8, 10).

16. The device according to claim 14, wherein the speeds (T2, T3) of the second and third conveyors (8, 10) give an object (100) transit time on the second and third conveyors (8, 10) substantially equal to the transit time of the pusher elements (3) along the length of the second and third conveyors (8, 10).

17. The device according to claim 14, wherein the second conveyor (8) comprises a first end (8a) giving onto the first conveyor (2) to receive from it an object (100) and move the object away from the pusher element (3), and a second end (8b), opposite the first end (8a), for releasing the object (100) towards the measuring station (5).

18. The device according to claim 13, wherein the third conveyor (10) is operatively associated with the first conveyor (2) or the second conveyor (8) to receive an object respectively from the first conveyor (2) or the second conveyor (8).

19. The device according to claim 18, wherein the third, conveyor (10) comprises a first end (10a) giving onto the accelerator means (6) or the first conveyor (2) to receive from them the object (100), and a second end (10b), opposite the first end (10a), giving onto the first conveyor (2).

20. The device according to claim 13, wherein the third conveyor (10) is operatively associated with the first conveyor (2) to release an object on it.

21. The device according to claim 20, wherein the third conveyor (10) comprises a first end (10a) giving onto the second conveyor (8) or the first conveyor (2) to receive from them the object (100), and a second end (10b), opposite the first end (10a), giving onto the first conveyor (2).

22. The device according to claim 20, wherein the speeds (T2, T3) of the second and third conveyors (8, 10) give an object (100) transit time on the second and third conveyors (8, 10) substantially equal to the transit time of the pusher elements (3) along the length of the second and third conveyors (8, 10).

23. A method for measuring a property of a moving object such as a wooden semi-finished product, the method comprising the steps of:
transporting an object (100) along a first conveyor (2) having a predetermined first feed speed (T1) and making the object (100) pass at a station (5) for measuring a predetermined property of the object (100), wherein the step of transporting the object (100) along the first conveyor (2) comprises the steps of preparing a plurality of pusher elements (3) with the same feed speed (T1) and integral with the first conveyor (2) and pushing the object (100) with a first pusher element or group of pusher elements (3);
accelerating the object (100) relative to the first feed speed (T1) by feeding and transporting the object (100) on a second conveyor (8) having a second transport speed (T2) which is greater than the first feed speed (T1);
during the step of transporting the object (100) on the second conveyor (8), the object (100) being moved away from the first pusher element or group of pusher elements (3) towards a pusher element or a group of pusher elements (3) immediately before it, the pusher elements (3) being fed at the first feed speed (T1) without interfering with the second conveyor (8);
slowing or stopping the object (100) relative to the first feed speed (T1) at least at the measuring station (5) by transferring the object (100) to a third conveyor (10) which has a third transport speed (T3) lower than the first feed speed (T1),
during a step of transporting the object (100) on the third conveyor (10), the pusher elements (3) being fed at the first feed speed (T1) without interfering with the third conveyor (10); and
feeding the object (100) at the first feed speed (T1) after the object (100) slowing or stopping step.

24. The method according to claim 23, wherein the pusher elements (3) are equidistant, the distance separating them being greater than the dimensions of the object (100) along the direction of feed (T).

25. The method according to claim 23, wherein the step of slowing or stopping the object (100) comprises the step of transferring the object (100) from the second conveyor (8) to the third conveyor (10).

26. The method according to claim 23, further comprising, after the accelerating step, the step of transferring the object (100) from the second conveyor (8) to the first conveyor (2), and wherein the step of slowing or stopping the object (100) comprises the step of transferring the object (100) from the first conveyor (2) to the third conveyor (10).

27. The method according to claim 23 wherein the step of feeding the object (100) at the first feed speed (T1) after the object (100) slowing or stopping step, is carried out by transferring the object (100) from the third conveyor (10) to the first conveyor (2).

28. The method according to claim 23 wherein, during a step of transferring the object (100) from the third conveyor (10) to the first conveyor (2), the first pusher element (3) reaches the object (100) to push it.

29. The method according to claim 23 wherein the object (100) transit time on the second and third conveyors (8, 10) is substantially equal to the transit time of the pusher elements (3) along the length of the second and third conveyors (8, 10).

30. The method according to claim 23, wherein a succession of objects (100) pass in front of the measuring station (5); the objects (100) in said succession of objects being spaced out.

31. The method of claim 23, wherein, during the step of transporting the object (100) on the second conveyor (8), the object (100) is moved away from the first pusher element or group of pusher elements (3) until it almost reaches the pusher element or the group of pusher elements (3) immediately before it.

32. A device for measuring a property of a moving object, the device comprising:
a station (5) for measuring a predetermined property of the object (100);
a first conveyor (2) for transporting the object (100) at a first transport speed (T1) towards the measuring station (5); the first conveyor (2) comprising a plurality of equidistant pusher elements (3), separated by a distance greater than the dimensions of the object (100) along a direction of transport (T); the object (100) being pushed along the first conveyor (2) by at least one of the pusher elements (3);
accelerator means (6) for accelerating the object (100), acting on the object and positioned upstream of the measuring station (5), the accelerator means (6) comprising a second conveyor (8) operatively associated with the first conveyor (2); the second conveyor (8) transporting the object (100) at a second transport speed (T2) greater than the first transport speed (T1) to move the object (100) away from the at least one of the pusher elements (3) towards a pusher element or a group of pusher elements immediately before it; the pusher elements (3) being fed at the first transport speed (T1) without interfering with the second conveyor (8);

and slowing means (7) for slowing or stopping the object (100), acting on the object and positioned at the measuring station (5), the slowing means (7) comprising a third conveyor (10) transporting the object (100) at the measuring station (5) at a third transport speed (T3) which is lower than the first transport speed (T1); the pusher elements (3) being fed at the first transport speed (T1) without interfering with the third conveyor (10).

33. The device of claim 32, wherein the second conveyor (8) is transporting the object (100) at the second transport speed (T2) to move the object (100) away from the at least one of the pusher elements (3) until the object (100) almost reaches the pusher element or the group of pusher elements immediately before it.

* * * * *